UNITED STATES PATENT OFFICE.

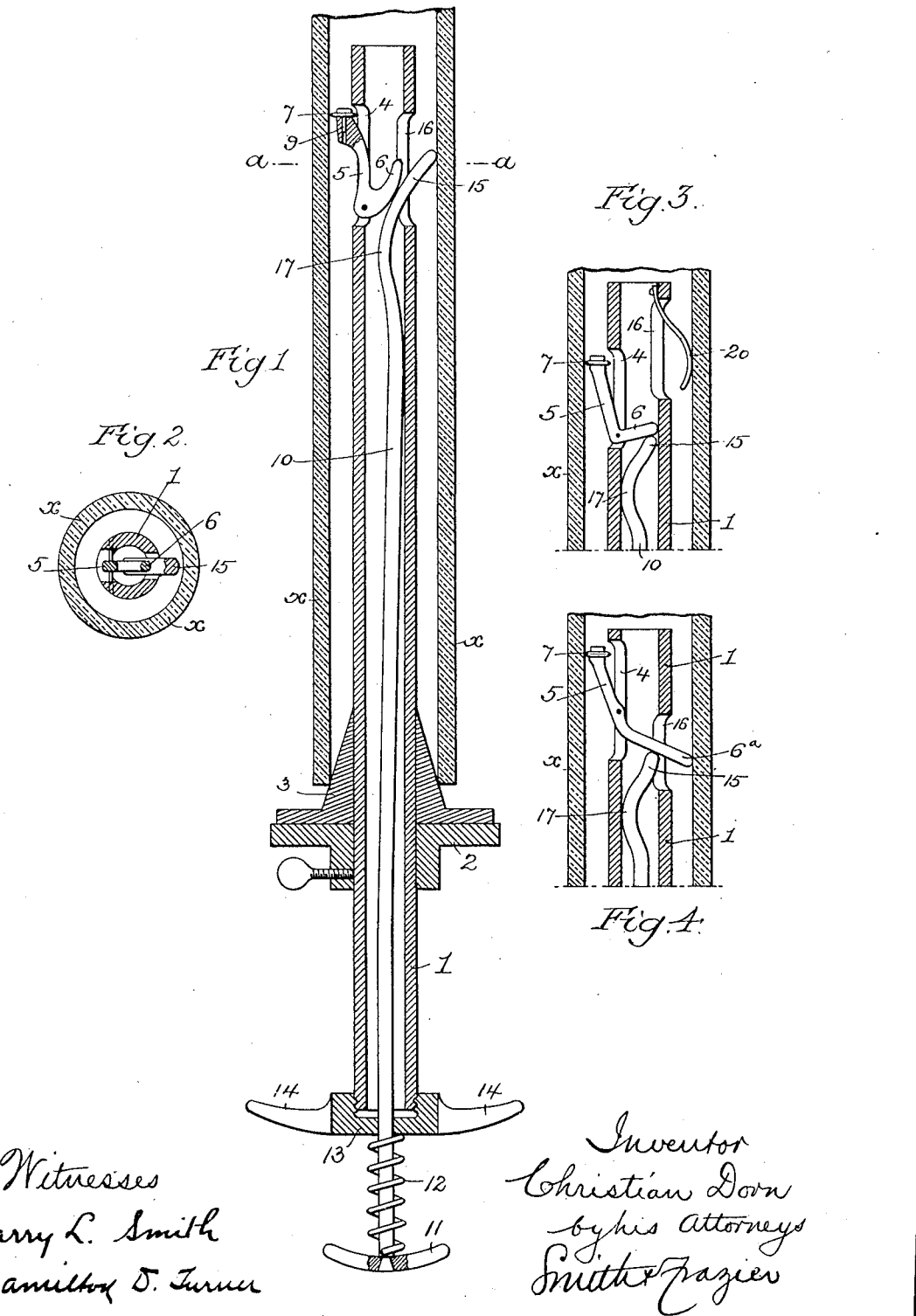

CHRISTIAN DORN, OF PHILADELPHIA, PENNSYLVANIA.

GLASS-TUBE CUTTER.

No. 887,604.

Specification of Letters Patent.

Patented May 12, 1908.

Application filed November 13, 1907. Serial No. 402,018.

*To all whom it may concern:*

Be it known that I, CHRISTIAN DORN, a citizen of the United States, residing in Philadelphia, Pennsylvania, have invented certain Improvements in Glass-Tube Cutters, of which the following is a specification.

The object of my invention is to so construct a device for cutting glass tubes as to prevent fracture of the tube due to excessive pressure of the cutter thereupon, to render the device self-centering in the tube, and to permit of the yielding of the cutter to accommodate any inequalities in the thickness of the glass of which the tube is composed. This object I attain in the manner hereinafter set forth, reference being had to the accompanying drawing, in which Figure 1 is a longitudinal vertical section of a glass tube cutter constructed in accordance with my invention and showing the parts in operative relation to the tube which is to be cut; Fig. 2 is a horizontal sectional view on the line *a—a*, Fig. 1, and Figs. 3 and 4 are longitudinal vertical sections of part of the device, illustrating certain modifications of my invention.

In Fig. 1 of the drawing, 1 represents a tube, preferably of metal and of a diameter which will permit it to pass freely within the smallest size of glass tube *x* which has to be cut, said tube 1 having, adjustably mounted upon it, a gage disk 2 for determining the distance between the end of the glass tube and the point at which the cut is to be made. Upon this disk 2 is supported a conical centering block 3, which receives the lower end of the glass tube, the conical surface of said centering block serving to properly center the lower end of said tube, or adjust it into a position concentric with the axis of the tube 1.

Suitably pivoted in a slotted portion 4 of the tube 1, near the forward end of the same, is a lever having two arms 5 and 6, the arm 5 having rotatably mounted upon its end a cutter 7 of hardened steel or other material, the pivot pin 9 for the cutter being adapted to an opening bored through the end portion of the arm 5 in order that said pin may be readily driven out when a cutter becomes dull and has to be replaced. The other arm 6 of the lever extends into the tube 1 and is turned upwardly in order that one face of the arm may bear upon the forward portion 15 of a projector rod 10, the bearing surfaces of the arm and rod being inclined in respect to the longitudinal axis of the tube 1. The rod 10 extends beyond the rear end of the tube 1, and has a knob or cap 11 upon which pressure can be exerted, a coiled spring 12 surrounding the rod and being interposed between said knob 11 and a screw cap 13 on the inner end of the tube, whereby said projector rod is normally retracted, said cap having projecting finger rests 14, in order to provide for the application of pressure to the knob 11 by means of the thumb when it is desired to project the rod 10. When the rod 10 is thus projected, its forward portion 15 will so act upon the arm 6 of the cutter-carrying lever as to move the cutter 7 into contact with the inner face of the tube to be cut, and by then rotating the tube 1, or the glass tube, one in respect to the other, the desired cutting of said glass tube will be effected.

When the rod 10 is projected, the forward portion 15 of said rod 10 extends outwardly through a slot 16 in the tube 1, and bears upon the inner face of the glass tube on that side of the same opposite to the cutter, as shown in Fig. 1, the result being that the tube 1 is properly centered in the glass tube at its forward end before and during the cutting operation.

In order to normally maintain the rod 10 centrally in the tube 1, when said rod is retracted, that portion of the rod adjacent to the portion 15 has a reverse bend 17 for bearing upon the inner face of the tube at a point diametrically opposite to the portion in which the slot 16 is formed.

Any inward pressure upon the cutter 7 during the time that it is making its cut is transmitted to the rod 10, and tends to force the same rearwardly, consequently, if the glass tube happens to be thicker at one place than another in the line of cut, the cutter can yield and thus prevent fracture of the glass tube due to excessive pressure thereupon, my invention, in this respect, being distinct from that class of tube cutters in which the back of a cutter-carrying arm bears upon the wedge-shaped or conical end of an operating rod, for in such cutters the angle of the cone is necessarily so steep that the cutter is practically held rigidly in contact with the inner surface of the glass tube, no amount of inward pressure upon said cutter being sufficient to cause a rearward yielding movement of the projector rod.

In that modification of my invention shown in Fig. 3, a spring finger 20 is mounted upon the tube 1 and projects through a slot in that side of the same which is opposite to the cutter 7, this spring being intended to perform the same function as the projecting end of the rod 10 in the construction shown in Figs. 1 and 2, the rod in the structure shown in Fig. 3 being wholly inside of the tube 1, and being prevented from turning therein, as, for instance, by squaring it for engagement with a square opening in the cap 13 at the rear end of the tube.

In the modification shown in Fig. 4 the inner arm 6ª of the cutter-carrying lever projects through a slot in the tube 1 and bears upon the inner face of the glass tube on the side opposite to the point at which the cut is being made, this projecting arm of the lever serving the same purpose as the projecting end of the rod 10 in properly centering the forward end of the tube 1 before and during the cut.

Prior devices of the class to which my invention relates have usually been provided with a pair of oppositely projecting cutter levers acted upon simultaneously by a beveled or wedge-shaped portion of the projector rod. Neither lever, therefore, could yield independently of the other, and, if the glass tube which was being cut happened to be thicker in one portion than another, the cutter operating at that side of the tube where the glass was thin could not contact with the same without the application of excessive force to the cutter acting upon the opposite side, and the application of such excessive force tended to break the tube. The use of a single cutter lever in connection with a yielding projector rod effectually overcomes this objection.

I claim:—

1. A glass tube cutter consisting of a tube having, at one side, a cutter-carrying lever, and, at the opposite side, a projecting and non-cutting bearing for said glass tube, which bearing is movable independently of the tube which carries it, such movement being in the direction of the axial line of said tube.

2. A glass tube cutter consisting of a tube having, at one side, a cutter-carrying lever, and, at the opposite side, a projecting and non-cutting bearing for said glass tube, which bearing is susceptible of yielding in a direction transverse to the axial line of the tube.

3. A glass tube cutter consisting of a tube having, at one side, a cutter-carrying lever, and, at the opposite side, a projecting and non-cutting bearing for said glass tube, which bearing is movable independently of the tube which carries it, such movement being in the direction of the axial line of said tube and is also susceptible of yielding in a direction transverse to said axis.

4. A glass tube cutter consisting of a tube having mounted thereon a lever with one arm projecting into the interior of the tube and another arm provided with a cutter, and a projector rod extending beyond said tube at its rear end and acting at its forward end upon the inwardly projecting arm of the cutter-carrying lever.

5. A glass tube cutter consisting of a tube having mounted thereon a lever with one arm projecting into the interior of the tube and another arm carrying a cutter, and a projector rod acting on the inner arm of said lever, said rod having a reversely bent forward end.

6. A glass tube cutter consisting of a slotted tube having mounted thereon a lever with one arm projecting into the interior of the tube and another arm carrying a cutter, and a projector rod acting on the inner arm of said lever, said rod being located in the tube and having a reversely bent forward end, one of said bends, when the rod is retracted, entering a slot in the tube, and the other bearing against the inner face of the tube at the side opposite to the slot.

7. A glass tube cutter comprising a tube with lever pivoted thereto, and having one arm projecting into the tube and another arm carrying a cutter, and a projector rod bearing upon the inner arm of the lever, and projecting beyond the tube, when the rod is projected, the contact faces of said lever arm and rod being inclined in respect to the axial line of the tube.

8. A glass tube cutter comprising a tube with cutter-carrying lever mounted thereon, and a projector rod, acting upon said lever to project the cutter, said rod also projecting from that side of the tube opposite to the cutter, whereby it acts to center the tube.

9. A glass tube cutter comprising a tube with cutter-carrying lever mounted thereon, and a projector rod acting upon said lever, the tube being slotted for the projection therefrom of both the cutter-carrying lever and projector rod, and the engaging surfaces of said lever and rod being inclined in respect to the longitudinal axis of the tube, whereby the extent of projection of the rod beyond the tube on one side is proportionate to the extent of projection of the cutter on the opposite side.

In testimony whereof, I have signed my name to this specification, in the presence of two subscribing witnesses.

CHRISTIAN DORN.

Witnesses:
HAMILTON D. TURNER,
KATE A. BEADLE.